United States Patent [19]

Champoux

[11] 4,423,619

[45] Jan. 3, 1984

[54] APPARATUS AND METHOD FOR PRESTRESSING A COUNTERSUNK FASTENER HOLE

[75] Inventor: Louis A. Champoux, Seattle, Wash.

[73] Assignee: Fatigue Technology, Inc., Seattle, Wash.

[21] Appl. No.: 273,725

[22] Filed: Jun. 15, 1981

[51] Int. Cl.³ .................. B21D 39/08; B23P 11/02
[52] U.S. Cl. ................................ 72/393; 72/370; 29/446
[58] Field of Search .............. 72/370, 391, 392, 393; 29/446, 523

[56] References Cited

U.S. PATENT DOCUMENTS

| | | | |
|---|---|---|---|
| 1,648,189 | 11/1927 | Ottinger | 72/393 |
| 3,683,658 | 8/1972 | Roeschlaub | 29/523 |
| 3,879,980 | 4/1975 | King, Jr. | 72/393 |
| 4,164,807 | 8/1979 | King, Jr. | 72/370 |
| 4,187,708 | 2/1980 | Champoux | 72/30 |
| 4,308,736 | 1/1982 | Lowe et al. | 72/393 |

*Primary Examiner*—Lowell A. Larson
*Attorney, Agent, or Firm*—Eugene O. Heberer

[57] ABSTRACT

A pull gun (30) is used for pulling a mandrel (32) through an expandable sleeve (126) positioned in a fastener hole (134, 136). The mandrel (32) expands the sleeve (126) as it moves through the sleeve (126), causing the sleeve (126) to prestress the metal which surrounds the hole (134, 136). The pull gun end of the hole is countersunk (138). The pull gun (30) includes an axially split ring (74) having a conical insert (90) which snugly fits within the countersink (138). The sleeve (126) extends through a center opening (80) in the expandable ring (126). Mandrel movement through the portion of the sleeve (126) within said central opening (80) forces the segments (76) of the ring (74) radially outwardly, causing the portions (90) of such ring (74) which are in the countersink (138) to expand and compress the metal which immediately surrounds the countersink (138). A solid film lubricant (127) is provided on the inner surface of the expandable sleeve (126). The coefficient of friction of such lubricant (127) and the contact area (66) of the mandrel (32) with the interior of the sleeve (126) are controlled for the purpose of providing a reaction force which is sufficient to generate enough pressure between the conical insert (90) and the walls of the countersink (138) to adequately compress the metal bounding the countersink (138).

34 Claims, 10 Drawing Figures

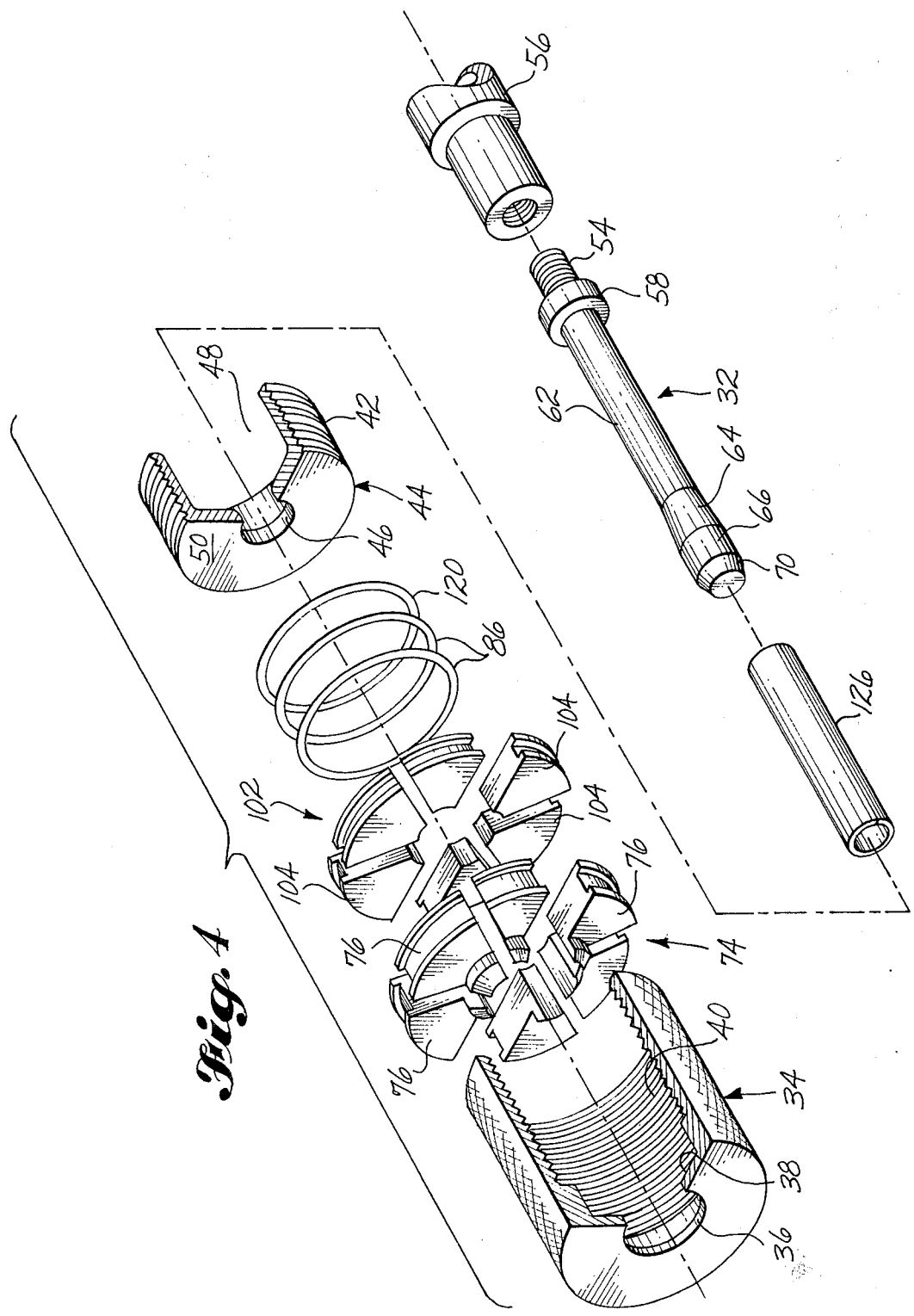

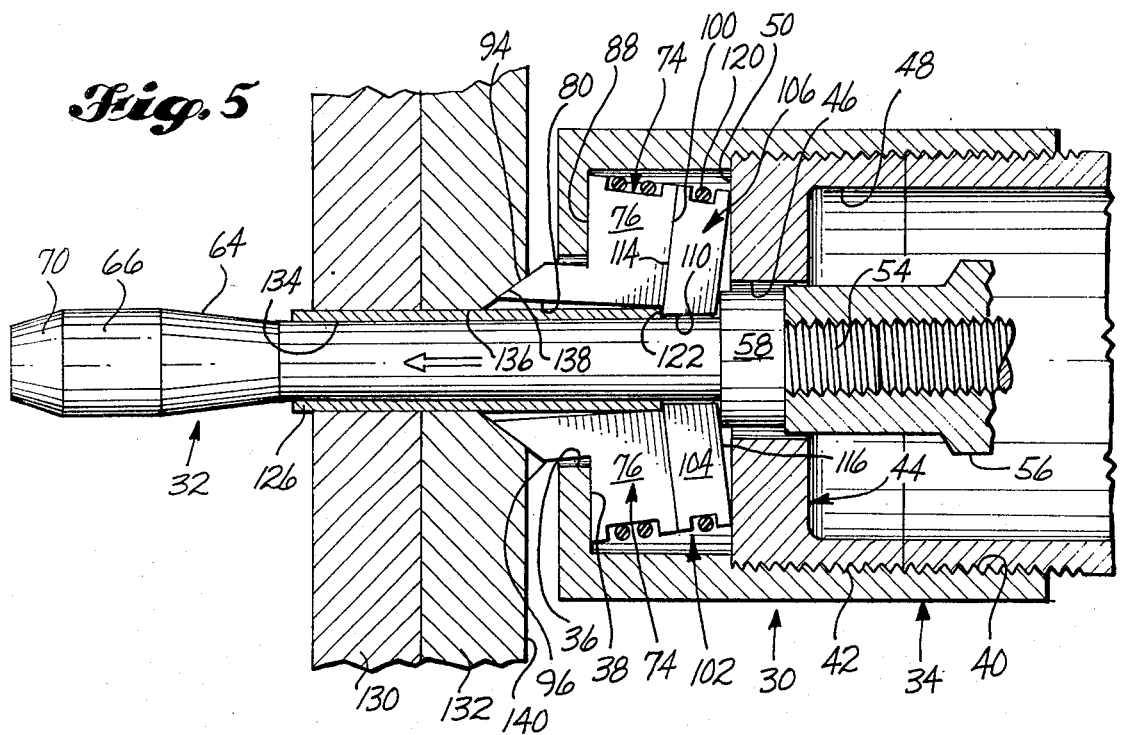
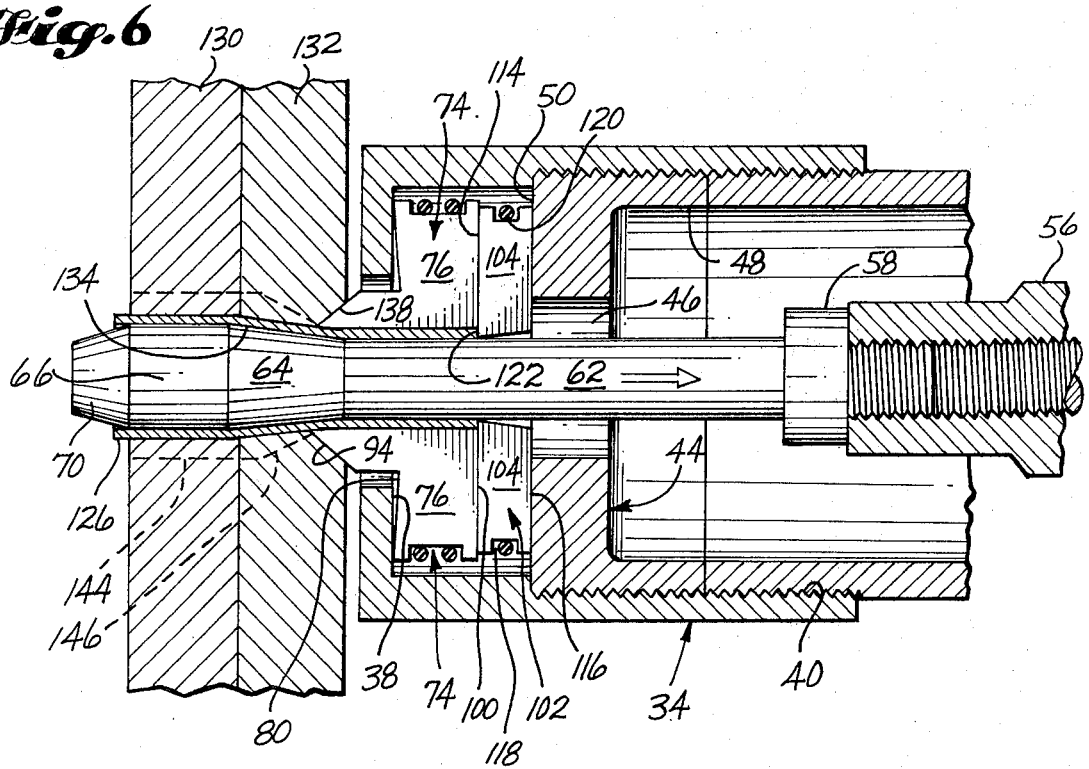

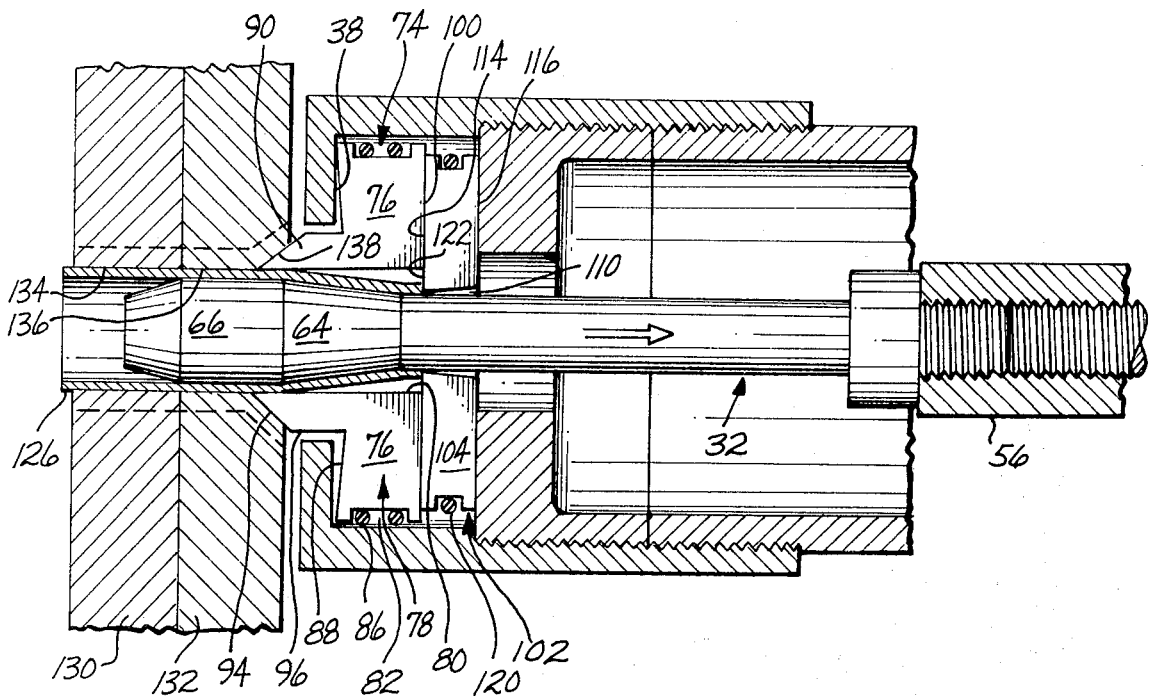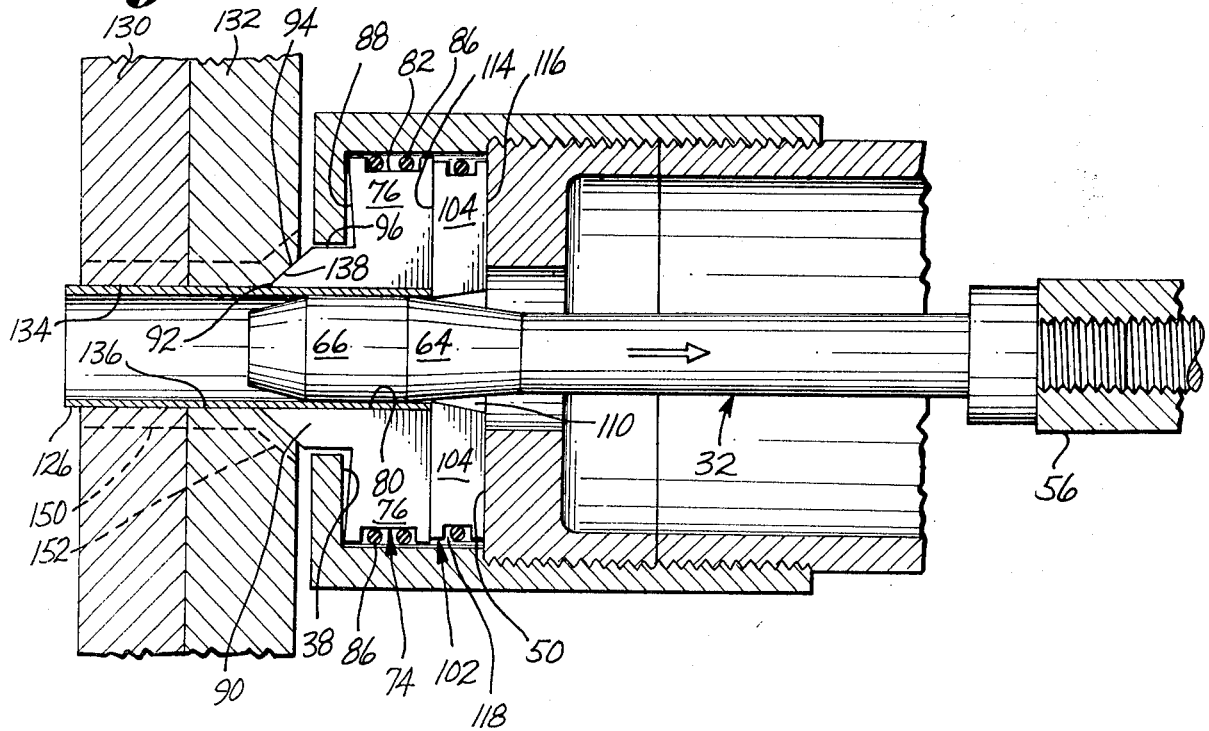

APPARATUS AND METHOD FOR PRESTRESSING A COUNTERSUNK FASTENER HOLE

DESCRIPTION

1. Technical Field

This invention relates to a method and apparatus for prestressing both countersink and straight portions of a countersunk fastener hole in a single operation.

2. Background Art

In the prior art, holes which were to have countersinks were prestressed as a straight hole and then the hole was countersunk. In this type of operation the holes were countersunk after being prestressed. This method of countersinking required one additional step that is eliminated by the present invention.

In addition, the prior art method of countersinking after prestressing limits the prestressing and the resulting improvement of fatigue properties of the countersink to the region of the prestressing of the straight hole; that is, prestressing before countersinking extends radially only as far as the prestressing of the straight hole. Another problem is that reworking of a hole which has been countersunk according to the prior art method, requires that the hole be drilled to an oversized condition with subsequent prestressing, reaming, countersink machining, and installation of an oversized fastener.

The basic patent relating to prestressing or cold expansion of fastener holes, by use of a lubricated spacer sleeve, is my U.S. Pat. No. 3,566,662, granted Mar. 2, 1971, and entitled Coldworking Method and Apparatus. A method and apparatus for making the sleeves is disclosed by U.S. Pat. No. 3,665,744, granted May 30, 1972, to Clair M. Harter, and entitled Method And Apparatus For Making Sleeves. U.S. Pat. No. 3,892,121, granted July 1, 1975, to me, Horace E. Hill and Joseph L. Phillips, and entitled Apparatus For Cold-Working Holes, discloses a form of mandrel and mandrel pulling tool or gun. My U.S. Pat. No. 4,187,708, granted Feb. 12, 1980, and entitled Pulling Apparatus And Method, discloses a preferred form of pull gun.

The aforementioned patents, the references cited against them, and a paper by Joseph L. Phillips entitled "Fatigue Improvement By Sleeve ColdWorking", should be carefully considered for the purpose of putting the present invention into proper perspective relative to the prior art.

DISCLOSURE OF THE INVENTION

The present invention provides an apparatus and method by which a previously drilled countersunk hole is prestressed in the region of the hole and the region of the countersink in a single one-sided operation.

The present invention requires only two process steps—the first being the drilling of the hole and the countersink in a single operation. The second is the prestressing or cold expansion of the hole and the countersink in a single one-sided operation. This method, and apparatus provided therefor, improve the fatigue properties in the region of the countersink and the hole and eliminate the separate machining of the countersink required by the prior art.

Accordingly, it is an object of the invention to provide optimum fatigue properties in a hole having a countersink by prestressing the countersink area in the same operation in which the hole is prestressed. The region of compressive residual stresses, according to the invention, extends radially outwardly from the outer edge of the countersink for a distance equal to the radial thickness of the prestress region of the hole. This is in contrast to the prior art wherein the extent of prestressing of the countersink is limited to the actual prestress of the straight hole.

It is another object of the invention to reduce the costs of the fastener hole drilling, countersinking, and prestressing in contrast to the prior art systems. The present invention eliminates the separate countersinking operations. The costs are also less than the prior interference fit fastener systems, because of reduced tolerances in the drill/countersinking operation, reduced inspection requirements, and because of the low interference, 0.0005 inch, with a fastener that does not require the driving operation employed with most high interference, 0.004 inch, fasteners.

It is a still further object of the invention to provide a prestressing system which reduces the susceptibility to stress corrosion by increasing the area of compressive residual stress around the edge of the countersink.

It is another object of the invention to provide prestressed countersink holes in which rework operations are less costly because the requirements to ream and re-countersink the hole are eliminated. In addition the low interference of the installed fastener facilitates easier removal when necessary, and thereby minimizes hole damage.

It is still another object of the invention to provide an improved method and apparatus for prestressing countersunk holes in which the length of the maximum diameter part of the mandrel and the coefficient of friction of the lubricant used within the sleeve are controlled as a way of controlling the reaction force which maintains the jaws loaded against the surface of the countersink.

Further objects and advantages of the invention may be brought out in the following part of the specification wherein small details have been described for the competence of disclosure, without intending to limit the scope of the invention which is set forth in the appended claims.

BRIEF DESCRIPTION OF THE DRAWINGS

Referring to the accompanying drawings, which are for illustrative purposes:

FIG. 4 is an exploded isometric view of the nose portion of the pull gun, the mandrel, and the prestressing sleeve;

FIG. 5 is the first of a series of four similar longitudinal sectional views illustrating the sequence of the prestressing operation according to the invention, the first view showing the nose portion of a pull gun, a portion of a work-piece immediately surrounding the hole and countersink to be prestressed, a prestressing sleeve in section, and the mandrel in side elevation, said first view showing the position of the prestressing tools immediately following the insertion of the mandrel and sleeve into the fastener hole;

FIG. 6 is a view similar to FIG. 5, illustrating the retraction of the mandrel by the pull gun, the increasing diameter portion and maximum diameter portion of the mandrel having commenced prestressing a portion of the workpiece, and the jaws of an expandable ring being forced into the countersunk portion;

FIG. 7 is a view similar to FIGS. 5 and 6, illustrating the mandrel in the process of exerting a generally radially outwardly directed force of the jaws of the expandable ring to prestress the countersink;

FIG. 8 is a view similar to FIGS. 5–7 illustrating the mandrel in a fully retracted position at the completion of the prestressing of the countersink;

BEST MODE OF THE INVENTION

Figure 1:
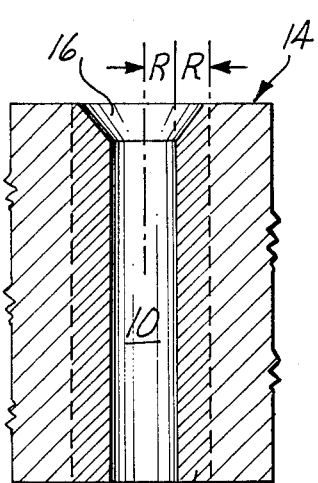
FIG. 1 is a longitudinal sectional view of a section of a workpiece, showing a countersunk fastener hole which has been prestressed with a prior art technique.

Referring again to the drawings, FIG. 1 is a view of a prestressed fastener hole 10 according to the prior art. The prestressing is indicated in the annular shaded area 12 in the workpiece 14. In the aircraft industry such a workpiece may typically be aluminum, titanium, or steel.

In the prior art, the prestressing occurred before the hole 10 was reamed, and countersunk at 16. The prestressing effect or compressive residual stresses around the hole extends radially the extent of one radius, for example, from the inner wall into the workpiece. Because countersinking occurred after prestressing, the amount of prestressing in the countersink region is reduced relative to that of the remainder of the hole. For example, at the outer edge of the countersink the prestressing extends substantially less than the length of the radius of the hole.

Figure 2:
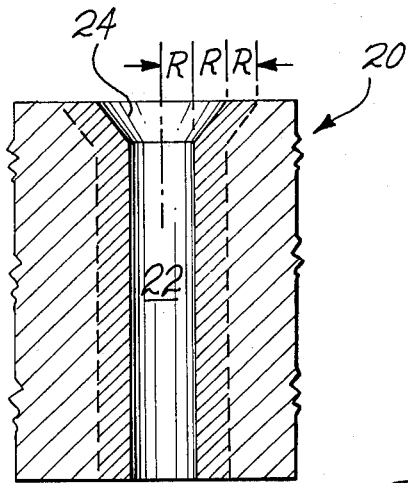
FIG. 2 is the same type of view as FIG. 1, but showing the region of compressive residual stress which results from prestressing in accordance with the present invention.

FIG. 2 shows a workpiece 20 in which a fastener hole 22 and a countersink 24 have been drilled in a single operation. Thereafter the area around the fastener hole and countersink was prestressed according to the invention so that the prestress radially outwardly the hole extends to the distance of one radius, for example, and similarly the prestressing of the countersink also extends a distance equal to one radius, for example.

Figure 3:
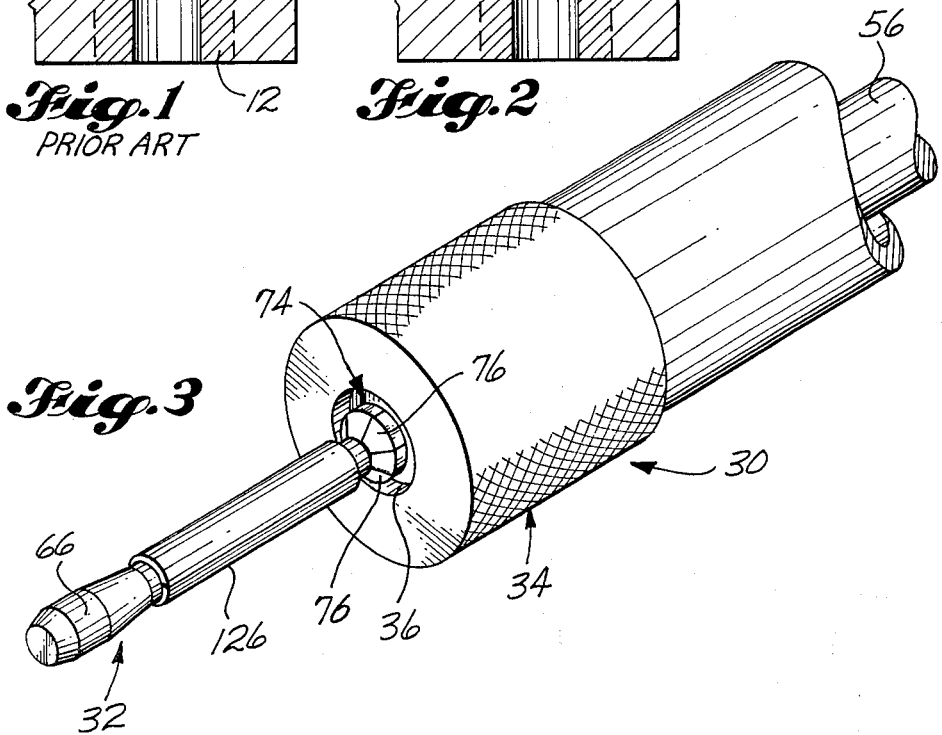
FIG. 3 is a fragmentary isometric view of the nose of a pull gun and a mandrel embodying features of the present invention.

In FIGS. 3 and 4 devices for prestressing a fastener hole and its countersink are shown in detail. A pull gun, generally designated as 30, is shown fragmentarily. Pull gun 30 may be of the type disclosed in my U.S. Pat. No. 4,187,708, granted Feb. 12, 1980.

The pull gun 30 is operated hydraulically to move a mandrel 32 from an extended, FIGS. 3 and 5, to a retracted position, FIG. 8. The hydraulic operating means is disclosed in detail in U.S. Pat. No. 4,187,708.

A nose cap 34 is provided at the working end of the pull gun. Nose cap 34 comprises a cylindrical side wall and a radial end wall 38 formed to include a cylindrical center opening 36. The end portion of nose cap 34 opposite end wall 35, includes internal threads 40 adapted to be threadedly engaged with external threads 42 of a jaw retainer nut 44 having the same general configuration as the nose cap 34. Nut 44 includes an end wall center opening 46 through which the mandrel is reciprocated.

The mandrel 32 is threadedly engaged at its inner end 54 to an adapter 56 which is reciprocated by the hydraulic means, as described in the aforementioned U.S. Pat. No. 4,187,708. A boss 58 on the mandrel 32 is in abutment with the adapter 56 when the mandrel 32 is tightly threadedly engaged therein.

Outwardly of the boss 58 is a small diameter or intermediate cylindrical portion 62 of the mandrel 32 and extending outwardly therefrom is an increasing diameter, truncated conical portion 64. The portion 64 terminates in a maximum diameter cylindrical portion 66, having a uniquely long axial length about equal to its diameter. The maximum diameter of the mandrel is slightly smaller than the diameter of the starting hole to be prestressed (e.g. smaller by an amount about equal to three times the sleeve wall thickness). The outer end of the mandrel is formed by a truncated conical decreasing diameter portion 70.

A generally cylindrical ring 74 is split along axial sections into six equal size segments 76 which when positioned together along their split surfaces have a generally cylindrical, axially directed passage 80 extending therethrough. The ring parts 76 have a circumferential annular groove 82 in which there are elastic rings 86 positioned to bias the segments 76 together. An outer annular surface 88 of the ring 74 slopes inwardly and terminates in an axially outwardly directed jaw forming portion 90 of each segment. The surface 88 is normally in partial contact with an annular shoulder 38 on the outer inside of the nose cap 34.

The inner surfaces of the ring sections 76 are segments of a cylindrical. Together they form the passage 80. The outer ends of the jaw portions 90 are in the nature of conical surfaces 94 with their largest diameter being axially inwardly and terminating in cylindrical surfaces 96 which in turn terminate in the annular surface 88. Inner annular surfaces 100 on the ring 74 are generally perpendicular to the surfaces forming the cylindrical passage 80.

A second generally cylindrical, split ring or disk 102 is formed of six segments 104, FIG. 4–8. Along the split surfaces the ring portions 104 are adapted to fit together to form a substantially cylindrical ring having an axially directed, generally conical passage 110 therethrough, the conical diverging inwardly so that the larger end of the passage 110 is at the inner end of the ring 102. The outer annular surfaces 114 of the ring 102 are normally in abutment with the inner annular surface 100 of the ring 74. Inner annular surfaces 116 are normally in contact with the annular surface 50 of the inner cap 44. The ring 102 has a circumferential annular groove 118 with an elastic ring 120 therein to bias the ring segments 104 and 106 together. The diameters of the passage 110 are smaller than the diameter of the cylindrical passage 80 so as to provide annular shoulders 122 on the inner circumferential surface of the annular surface 114.

The segments of the rings 74 and 102 are limited in axial movement to the extent provided by the acute angle formed radially inwardly by the surface 38 of the cap 34 and the surfaces 88 of the outer ring, FIGS. 5–8.

When the mandrel 32 is extended, FIGS. 3 and 4, a thin axially split, cold-expansion or prestressing steel sleeve 126 is slipped over the outer end of the mandrel onto the small diameter portion 62. Such a cold-expansion sleeve has a comparable or higher modulus and yield than the material of the workpiece. The interior surface 127 of the sleeve 126 has a solid film lubricant of a commercial type which includes lead oxide, graphite, and molybdenum disulfide. This lubricant film is capable of withstanding more than 400,000 psi. See the aforementioned U.S. Pat. No. 3,566,662, and U.S. Pat. No. 3,665,744, granted May 30, 1972, to Clair M. Harter, for detailed descriptions of the sleeves and a manner of constructing them. Also see the aforementioned article entitled "Fatigue Improvement By Sleeve Coldworking" for a discussion of lubricant selection. The preferred lubricant comprises molybdenum disulfide, graphite, a binder, a solvent (e.g. toluol) and possibly some lead oxide. As is known to those skilled in the art, the coefficient of friction of this lubricant can be varied by changing the various components.

In FIGS. 5-8, the prestressing operation of the invention is illustrated. Two abutting workpieces 130 and 132, adapted to be secured together by a fastener, have holes 134 and 136, respectively, drilled therethrough. The hole 136 has a countersink 138 which typically is made in the same operation as the hole 136, the countersink having the same angle as the surfaces 94 of the jaws 90.

In FIG. 5, the mandrel 32 is in the fully extended position relative to the gun 30 and has been moved through the holes 134 and 136. The sleeve 126 is positioned on the small diameter portion 62 of mandrel 32. The outer end surface 35 of the nose cap 34 is spaced from the workpiece surface 140.

When the mandrel 32 is in the fully extended position, FIG. 5, the outer surface of the boss 58 is in contact with the surfaces 116 of the segments of the ring 102 so that the segments of both rings are tilted with respect to the gun and the workpiece. The surfaces 88 are in full contact with the shoulder 38 of the nose cap 34 and the conical surfaces 94 of the jaws are in partial contact with the countersink 138. The shoulder area 122 of the surfaces 114 of the ring 102 are in contact with the inner end of the sleeve and the cylindrical surface 80 of the ring 74 engage the outer surface of the sleeve but are tilted away from the sleeve as they extent axially outwardly.

Because the prestressing process is a one-sided operation, the split sleeve 126 is installed on the mandrel 32 prior to inserting the mandrel 32 and sleeve 126 into the hole to be expanded and prestressed. A clearance between the sleeve and the wall of the hole is necessary and is equal to approximately 0.003 inch. As may be visualized from FIG. 8, to overcome this clearance, it is necessary for the beginning of the tapered section 64 of the mandrel to travel axially, after contact, approximately 0.065 inch before starting to expand the hole 134.

As shown in FIG. 6, the mandrel has been retracted substantially with respect to the work piece 130, and the increasing diameter portion 64 and the maximum diameter portion 66 have prestressed the area around the hole 134 as indicated by the broken lines 144 and 146, respectively. In the axial movement of the mandrel, the diameter of the sleeve 126 is stretched and the prestressed area is compressed as shown. In the axial movement prior to that indicated by FIG. 6, the surfaces 116 of the ring 102 had moved into abutment with the shoulder 50 on the inner cap. The surfaces 100 and 114 of the respective rings had moved into abutment so as to be at right angles to the axis of the mandrel. The cylindrical surfaces of the ring passage 80 had moved into contact with the sleeve and the conical surfaces 94 of the jaws 90 had moved so as to fully engage the countersink 138 but with no radial pressure. During the prestressing of the surfaces as indicated at 144 and 146 by the radial expansion of the sleeve, the shoulders 122 fully restrain the sleeve against any axial movement.

As shown in FIG. 7, the ring members remain axially in the same positions as in FIG. 6, and as the mandrel is retracted, the changing diameter portion 64 stretches the hole portions as it passes therethrough. In FIG. 7 mandrel 32 is in a position where the prestressing of the cylindrical hole portions has been completed. When the changing diameter portion 64 of the mandrel is moved so as to be in radial alignment with the jaws 90, the sleeve is further stretched so as to move the ring segments 76 of the ring 74 radially outwardly, FIG. 7, so that the conical surfaces 94 of the jaws 90 move into a high pressure prestressing contact with the countersink surface 138. The very substantial compressive force exerted thereagainst prestresses the countersink region, as shown in FIGS. 7 and 8.

In FIG. 8, the maximum diameter portion 66 has moved out of the hole portions and has stretched the entire sleeve so that the inner end is in contact with the cylindrical surfaces 80 of the ring 74. In FIG. 8, the maximum diameter portion 66 continues to exert radial force on the ring so as to continue the stretching of the countersink until it moves almost totally out of the inner end of the sleeve. At this point the prestressing of the couuntersink has been completed to the extent shown in FIG. 2, where the prestressing on the countersink is the same distance from the surface thereof as is the distance of the prestressing from the wall surface of the hole, in contrast to the prior art prestressing shown in FIG. 1.

A considerable pulling force is required to pull the mandrel through the sleeve and cold-expand or prestress the hole and countersink. The maximum diameter cylindrical portion 66 of the mandrel increases the friction and pulling forces during the prestressing operation around the hole. For 3/16"-½" diameter holes in various aluminums these forces are in the range of 2,000 to 9,000 lbs. This same pulling force on the mandrel reacts against the jaws 90 and this reaction prevents the surfaces 94 from sliding out of the countersink during the prestressing operation. The jaws 94 are held axially in the countersink by means of the positioning of the two rings 74 and 102 between the shoulders 38 and 50 and the arrangement of the sleeve on the shoulders 122, but this arrangement does not cause any great prestressing force against the countersink. According to an aspect of the invention, the coefficient of friction of the lubricant within the sleeve and the axial length of mandrel portion 66 are controlled in order to obtain an effective reaction force. Preferably, the length of mandrel portion 66 is substantially equal to the diameter at mandrel portion 66.

As stated, there is a minimum of 0.003 inch clearance between the outside of the sleeve and the wall of the hole for the larger diameter portions of the mandrel to enter the hole and sleeve. The taper of the mandrel increasing diameter portion 64 is 0.045 inch/inch and it has to travel 0.022 inch for each 0.001 inch of the aforesaid clearance or a minimum of 0.066 inch travel. In the action depicted in FIGS. 7 and 8, there is no clearance between the surfaces 94 and the countersink. Therefore, part of the countersink and part of the hole are expanded simultaneously so as to result in a required higher pulling force. This increases the prestressing through a coining effect.

Another feature that helps maintain the jaw surfaces 94 on the countersink, is that the outside of the sleeve is not lubricated. It first locks itself in the wall of the hole when the mandrel starts to expand the hole, and the friction between the outside of the sleeve and the jaws also provides a force to contain the segmented jaws in the countersink. As previously stated, the coefficient of friction of the lubricant within the sleeve is controlled as a further way of maintaining the jaw surfaces 94 on the countersink.

Figure 9:
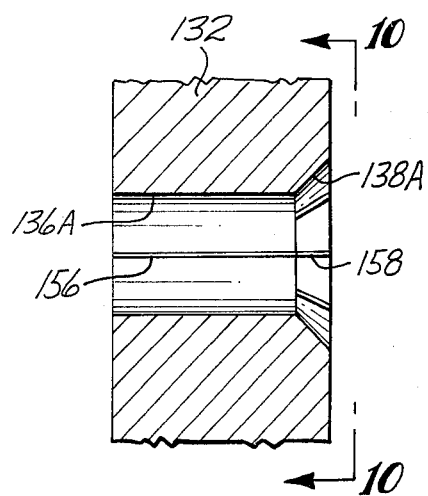
FIG. 9 is a longitudinal sectional view of the countersunk fastener hole, showing a ridge formed in the cylindrical portion by a split sleeve and similar ridges formed by the countersink prestressing ring jaws.
Figure 10:
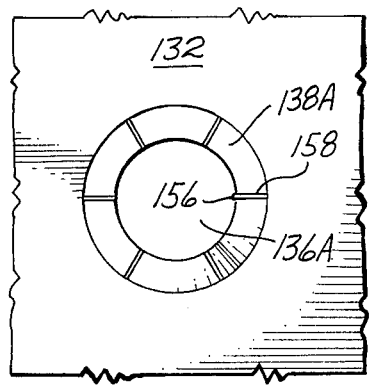
FIG. 10 is an end view looking axially towards the fastener hole from the countersunk side, taken generally from the aspect of line 10—10 in FIG. 9.

In FIGS. 9 and 10, the workpiece 132 is shown after the hole and countersink have been prestressed. That is, when the sleeve and mandrel have been removed, the hole 136 has been expanded to be as 136A and the countersink has been expanded to be as 138A. As the split sleeve 126 is expanded in the hole, its diameter is stretched and the split is widened. The presence of the split results in formation of a small ridge 156. Similarly, the splits between the jaw surfaces 94 create very small marks 158 in the countersink. The marks in the countersink are of no significance to the rivets or bolts fit into the fastener holes. In some installations it may be desirable to remove the ridge 156 by broaching or reaming, but it is now believed that resizing broaching is unnecessary.

The invention and its attendant advantages will be understood from the foregoing description and will be apparent that various changes may be made in the form, construction, and arrangement of the parts of the invention without departing from the spirit and scope thereof or sacrificing its material advantages, the arrangements hereinbefore described being merely by way of example. I do not wish to be restricted to the specific form shown or uses mentioned except as defined in the accompanying claims.

I claim:

1. In a pull gun of a type which is used for pulling a mandrel through a split prestressing sleeve located within a fastener hole, so that an increasing diameter portion and an adjacent maximum diameter portion of the mandrel can exert expansion forces on the sleeve, to cause the sleeve to be expanded in the radial direction and prestressing the metal around the fastener hole, to in that manner improve fatigue properties of the metal, the improvement comprising:

an axially split, segmented expandable ring member having a central passageway through which the mandrel travels as it is being retracted into the pull gun;

said passageway being normally smaller in diameter than the maximum diameter of the mandrel and a substantial part of the increasing diameter portion of the mandrel, so that as the mandrel moves through such passageway it enlarges the passageway by forcing the segments of the ring member apart; and said ring member segments including means to engage a countersunk portion of said hole to prestress metal forming the same when said segments are forced apart in response to axial movement of the mandrel through said expandable ring member.

2. Apparatus according to claim 1 in which:
said means to engage are conical shaped jaw portions having substantially the same angle as said countersunk portion.

3. Apparatus according to claim 1 in which:
said maximum diameter portion has an axial length about equal to its diameter.

4. Apparatus according to claim 1 in which:
said means to engage are jaw portions which together form a segmented annular jaw sized to fit within the countersunk portion.

5. Apparatus according to claim 1 in which:
said increasing and maximum diameter portions enlarge said passageway in said expandable ring member to force said segments apart outwardly whereby said countersunk portion is stretched and prestressed.

6. Apparatus according to claim 4 in which:
said expandable ring member is fitted in one end of said gun, said end being the end through which said mandrel is retracted;
said jaw portions extending outwardly from said one end;
a second expandable member in said gun inwardly of said ring member and fitted around said mandrel;
said second member having inner surfaces thereof in abutment with a gun surface and said ring member being in fixed axial abutment with said second member when said annular jaw is prestressing said countersunk portion.

7. Apparatus according to claim 6 in which:
an axial inner portion of said sleeve on said mandrel extends through said passageway in said ring member; and
means on second expandable member extending adjacent and around said mandrel to support said inner end of said sleeve against inwardly axial movement when said mandrel is being retracted during the prestressing operation.

8. Apparatus according to claim 7 in which:
said second member is an axially split disk having a passageway through which said mandrel extends;
said passageway through said second member being generally conical and having its smallest diameter toward said inner end of said sleeve;
said means on said second member extending generally radially from said smallest diameter along a surface of said second member in abutment with said ring member;
said second member radial surface providing a shoulder to support said inner end of said sleeve.

9. A method of prestressing a countersunk fastener hole or the like in a metal member, comprising:
positioning a prelubricated cold-expansion sleeve on a reduced diameter intermediate portion of a cold-expansion mandrel, said intermediate portion being axially inwardly of an increasing diameter portion, a maximum diameter portion of said mandrel extending outwardly of said increasing diameter portion;
inserting the mandrel and sleeve into the hole from its countersunk side;
holding the sleeve in the hole while retracting the mandrel through the sleeve and through an axially split ring having an axially split annular prestressing portion projecting into the countersink, so that as the mandrel is retracted the increasing diameter and maximum portions of the mandrel expand the sleeve radially to prestress the metal surrounding said hole, and expand the ring and annular portion radially to prestress the metal surrounding the countersink.

10. The method of claim 9, wherein the sleeve is held in the hole by contacting its inner end with an axially split disk.

11. The method of claim 9, comprising controlling the friction of the maximum diameter portion of the mandrel within the sleeve to in that manner produce a reaction force between the mandrel and the hole sufficient to maintain the annular portion of the axial split ring in prestressing contact with the surface of the countersink during axial movement of the increasing diameter portion of the mandrel through said ring.

12. The method of claim 11, comprising controlling the coefficient of friction of the lubricant to in that manner control the friction of the maximum diameter portion of the mandrel within the sleeve and hole.

13. The method of claim 11, comprising controlling the length of the maximum diameter portion of the mandrel to in that manner control the friction of the maximum diameter portion of the mandrel within the sleeve and hole.

14. Apparatus for prestressing a countersunk fastener hole, comprising:
- a mandrel for inserting into the hole for retracting therefrom, said mandrel having a reduced diameter portion, an increasing diameter portion axially outwardly of said reduced diameter portion, and a maximum diameter portion axially outwardly of said increaing diameter portion, said maximum portion having a slightly smaller diameter than the fastener hole diameter:
- an expandable disposable cold-expansion sleeve on the reduced diameter portion and insertable into the hole to serve as a spacer during the prestressing operation, for receiving exerted sliding expansion forces from said increasing diameter and maximum diameter portions as the mandrel is retracted through the hole while simultaneously carrying said forces in a radial direction to the inside surface of the hole for hole enlargement and for compression of the metal around the hole to improve fatigue properties of the metal; and
- an axially split, expandable ring member having a central passageway for receiving said mandrel and having a segmented annular portion sized to fit into the countersink of the hole;
- said increasing diameter and maximum diameter portions of the mandrel being adapted to be received in said passageway and expand said ring member to force said annular portion radially outwardly against the countersink surface to compress the metal of and around the countersink to improve the fatigue properties of the metal in the region of the countersink.

15. Apparatus according to claim 14 in which:
the axial length of the maximum diameter portion is about equal to its diameter.

16. Apparatus according to claim 14 including:
means for supporting the split ring member axially as it is being expanded and to support said sleeve axially.

17. Apparatus according to claim 16 in which:
said maximum diameter portion and said annular portion are sized so that the radial distance of prestressing the countersink is the same as that of the remainder of the fastener hole.

18. Apparatus for prestressing a fastener hole, comprising:
- a mandrel for inserting into the hole and for retracting therefrom; said mandrel having a reduced diameter portion, an increasing diameter and a maximum diameter portion respectively axially outwardly of said reduced diameter portion;
- an axially split, expandable ring member having a central passageway for receiving said mandrel, and having segmented arcuate portions;
- said increasing diameter and maximum portions being adapted to be received in said passageway and expand said ring member to force said arcuate portions outwardly;
- said maximum diameter portion having an axial length about equal to its diameter.

19. Apparatus according to claim 18 including:
a disposable expandable sleeve insertable into the hole, while positioned on the reduced diameter portion of the mandrel, to serve as a force transmitting spacer during the prestressing operation, for receiving exerted sliding expansion forces from increasing diameter and maximum portions as the mandrel is retracted through the hole while simultaneously carrying said forces into radial direction to the inside surface of the hole for hole enlargement and for compression of the metal around the hole to improve fatigue properties of the metal.

20. Apparatus according to claim 19, including:
a solid lubricant coating on the inner surface of the expandable sleeve, providing the inner surface of the expandable sleeve with a predetermined coefficient of friction.

21. Apparatus according to claim 19 including:
means for supporting the sleeve axially as said split ring member it is being expanded.

22. In a pull gun of a type which is used for pulling a mandrel through a prestressing sleeve located within a fastener hole, so that an increasing diameter portion and an adjacent maximum diameter portion of the mandrel can exert expansion forces on the sleeve, to cause the sleeve to be expanded in the radial direction and prestress the metal around the fastener hole, to in that manner improve fatique properties of the metal,
the improvement comprising:
- an expandable member having axially split portions and having a generally central passageway through which the mandrel travels as it is being retracted into the pull gun;
- said axially split portions being annularly spaced around said passageway and normally being held radially toward the center of said passageway;
- said passageway being normally smaller in diameter than the maximum diameter of the mandrel and a substantial part of the increasing diameter portion of the mandrel, so that as the mandrel moves through such passageway it enlarges the passageway by forcing the split portions of the member apart; and
- said member including means to engage a countersunk portion of said hole to prestress metal forming the same when said split portions are forced apart in response to axial movement of the mandrel through said passageway.

23. The invention according to claim 22 in which:
said means to engage are conical-shaped portions of said split portions, having substantially the same angle as said countersunk portion.

24. The invention according to claim 22 in which:
said member having an inner end secured within said gun and having an outer end extending outwardly of said gun;

said means to engage being on the outer end of said member;

said means to engage are conical-shaped portions on said split portions, having angles complementary to the countersink angle.

25. A method of prestressing a countersunk fastener hole in a metal member, comprising:

positioning a prelubricated cold-expansion sleeve on a reduced diameter intermediate portion of a cold-expansion mandrel, said intermediate portion being axially inwardly of an increasing diameter portion, a maximum diameter portion of said mandrel extending outwardly of said increasing diameter portion;

inserting the mandrel and sleeve into the hole from its countersunk side; and holding the sleeve axially in the hole while retracting the mandrel through the sleeve and through an axially split member having axially split arcuate prestressing portions projecting into the countersink, so that as the mandrel is retracted the increasing diameter and maximum portions of the mandrel expand the sleeve radially to prestress the metal surrounding said hole, and expand the arcuate portions radially to prestress the metal surrounding the countersink.

26. The method of claim 25 in which:

the sleeve is held in the hole with retaining means associated with said member and secured in a mandrel retracting pull gun.

27. A method according to claim 26 in which:

said retaining means is axially split, having a central passageway through which the mandrel travels while being retracted; and means on an inner portion of said mandrel for engaging said retaining means when the mandrel is in the fully extended position to position the retaining means so that it can engage the sleeve axially.

28. Apparatus for prestressing a countersunk fastener hole, comprising:

a mandrel for inserting into the hole for retracting therefrom, said mandrel having a reduced diameter portion, an increasing diameter portion axially outwardly of said reduced diameter portion, and a maximum diameter portion axially outwardly of said increasing diameter portion;

an expandable disposable cold-expansion sleeve on the reduced diameter portion and insertable into the hole to serve as a spacer during the prestressing operation, for receiving exerted sliding expansion forces from said increasing diameter and maximum diameter portions as the mandrel is retracted through the hole while simultaneously carrying said forces in a radial direction to the inside surface of the hole for hole enlargement and for prestressing of the metal around the hole to improve fatigue properties of the metal; and an axially split, expandable member having a central passageway for receiving said mandrel and having split arcuate portions sized to fit into the countersink of the hole;

said increasing diameter and maximum diameter portions of the mandrel being adapted to be received in said passageway and expand said member to force said arcuate portions radially outwardly against the countersink surface to prestress the metal of and around the countersink to improve the fatigue properties of the metal in the region of the countersink.

29. Apparatus according to claim 28 in which:

the axial length of the maximum diameter portion is about equal to its diameter.

30. Apparatus according to claim 28 including:

means for supporting the split member axially as it is being expanded and to support said sleeve axially.

31. Apparatus according to claim 30 in which:

said maximum diameter portion and said arcuate portions are sized so that the radial distance of prestressing the countersink is the same as that of the remainder of the fastener hole.

32. Apparatus for prestressing a fastener hole, comprising:

a mandrel for inserting into the hole and for retracting therefrom; said mandrel having a reduced diameter portion, an increasing diameter and a maximum diameter portion respectively axially outwardly of said reduced diameter portion;

an axially split, expandable member having a central passageway for receiving said mandrel, and having split arcuate portions;

said increasing diameter and maximum portions being adapted to be received in said passageway and expand said member to force said arcuate portions outwardly;

said maximum diameter portion having an axial length about equal to its diameter;

said arcuate portions on said member having outer ends sized to fit into a countersink of the hole and for being expanded with said member to force said arcuate portions into the countersink to prestress the metal surrounding the countersink.

33. Apparatus for prestressing a fastener hole, comprising:

a mandrel for inserting into the hole and for retracting therefrom; said mandrel having a reduced diameter portion, an increasing diameter and a maximum diameter portion respectively axially outwardly of said reduced diameter portion;

an axially split, expandable member having a central passageway for receiving said mandrel, and having split arcuate portions;

said increasing diameter and maximum portions being adapted to be received in said passageway and expand said member to force said arcuate portions outwardly;

said maximum diameter portion having an axial length about equal to its diameter; and a disposable expandable sleeve insertable into the hole, while positioned on the reduced diameter portion of the mandrel, to serve as a force transmitting spacer during the prestressing operation, for receiving exerted sliding expansion forces from said increasing diameter and maximum portions as the mandrel is retracted through the hole while simultaneously carrying said forces in the radial direction to the inside surface of the hole for hole enlargement and to prestress the metal around the hole to improve fatigue properties of the metal;

said actuate portions on said member having outer ends sized to fit into a countersink of the hole and for being expanded with said member to force said arcuate portions into the countersink to prestress the metal surrounding the countersink.

34. Apparatus for prestressing a fastener hole having a countersink, comprising:

a mandrel for inserting into the hole and for retracting therefrom; said mandrel having a reduced diameter portion, an increasing diameter and a maximum diameter portion respectively axially outwardly of said reduced diameter portion;

an axially split, expandable member having a central passageway for receiving said mandrel, and having split arcuate portions;

said increasing diameter and maximum portions being adapted to be received in said passageway and expand said member to force said arcuate portions outwardly into said countersink;

said maximum diameter portion having an axial length about equal to its diameter to insure that the arcuate portions remain in the countersink after the member has been expanded to prestress the metal surrounding the countersink.

* * * * *

UNITED STATES PATENT AND TRADEMARK OFFICE
CERTIFICATE OF CORRECTION

PATENT NO. : 4,423,619
DATED : January 3, 1984
INVENTOR(S) : Louis A. Champoux

It is certified that error appears in the above-identified patent and that said Letters Patent are hereby corrected as shown below:

Column 1, line 46, "ColdWorking" should be --Coldworking--.

Column 2, line 65, "work-piece" should be --workpiece--.

Column 3, line 63, "35" should be --38--.

Column 12, line 62, "actuate" should be --arcuate--.

Signed and Sealed this

Twelfth Day of June 1984

[SEAL]

*Attest:*

*Attesting Officer*

GERALD J. MOSSINGHOFF

*Commissioner of Patents and Trademarks*